United States Patent [19]

Bahder

[11] Patent Number: 4,487,994
[45] Date of Patent: Dec. 11, 1984

[54] ELECTRICAL CABLE JOINT STRUCTURE AND METHOD OF MANUFACTURE

[75] Inventor: George Bahder, Edison, N.J.

[73] Assignee: Cable Technology Laboratories, Ltd., New Brunswick, N.J.

[21] Appl. No.: 319,429

[22] Filed: Nov. 9, 1981

[51] Int. Cl.³ .......................................... H02G 15/184
[52] U.S. Cl. .................................... 174/73 R; 156/49; 174/DIG. 8; 264/515; 432/225
[58] Field of Search .......... 174/73 R, 73 SC, DIG. 8; 156/49

[56] References Cited

U.S. PATENT DOCUMENTS

| 2,716,777 | 9/1955 | Hagen | 174/DIG. 8 |
| 2,936,491 | 5/1960 | Hamlin | 174/DIG. 8 |
| 3,554,999 | 1/1971 | Shaw et al. | 174/DIG. 8 |
| 4,304,616 | 12/1981 | Richardson | 174/73 R X |
| 4,378,463 | 3/1983 | Senior et al. | 174/73 R |

FOREIGN PATENT DOCUMENTS

| 2748371 | 5/1978 | Fed. Rep. of Germany . | |
| 2312128 | 12/1976 | France | 174/73 R |
| 54-10992 | 1/1979 | Japan | 174/73 R |
| 2036460 | 6/1980 | United Kingdom | 174/DIG. 8 |

Primary Examiner—Laramie E. Askin
Attorney, Agent, or Firm—Darby & Darby

[57] ABSTRACT

A multilayer, heat shrinkable composite tube covering is provided for a cable joint structure in which intimately joined layers define a semiconductive inner or conductor shield, an insulation layer, and an outer or insulation shield for the joint. Furthermore, a highly resistive semiconducting layer is provided over the joint under the innermost layer of the composite tube, forming a dual layer conductor shield for the joint. In the preferred embodiment, the entire composite tube is pressure extruded in a common operation and all three layers are simultaneously chemically cured and cooled under pressure to provide the intimately joined layers of the composite tube. Subsequently, when the tube is shrunk over the joint, the three layers shrink as a unit, so that there is no possibility of trapping impurities or gas bubbles between layers.

17 Claims, 3 Drawing Figures

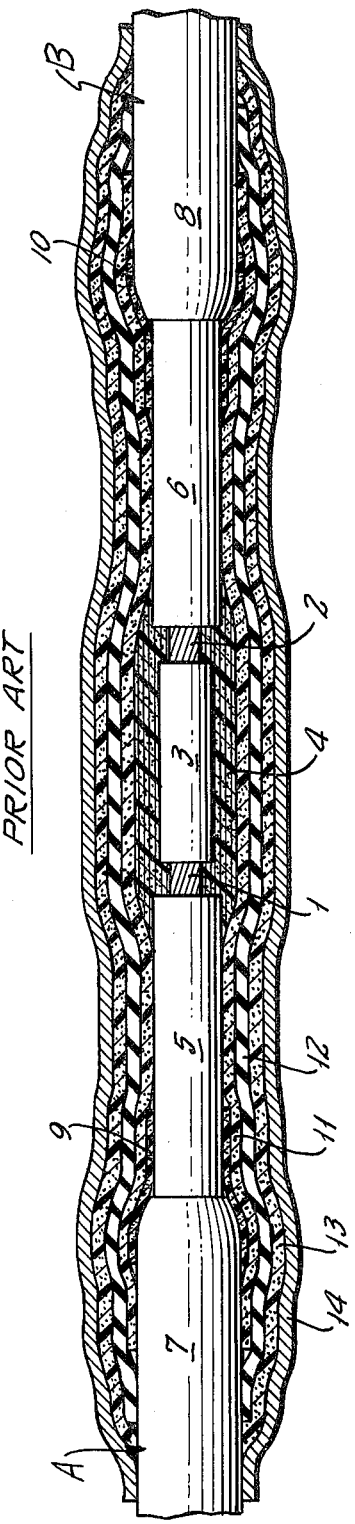
FIG. 1. *PRIOR ART*
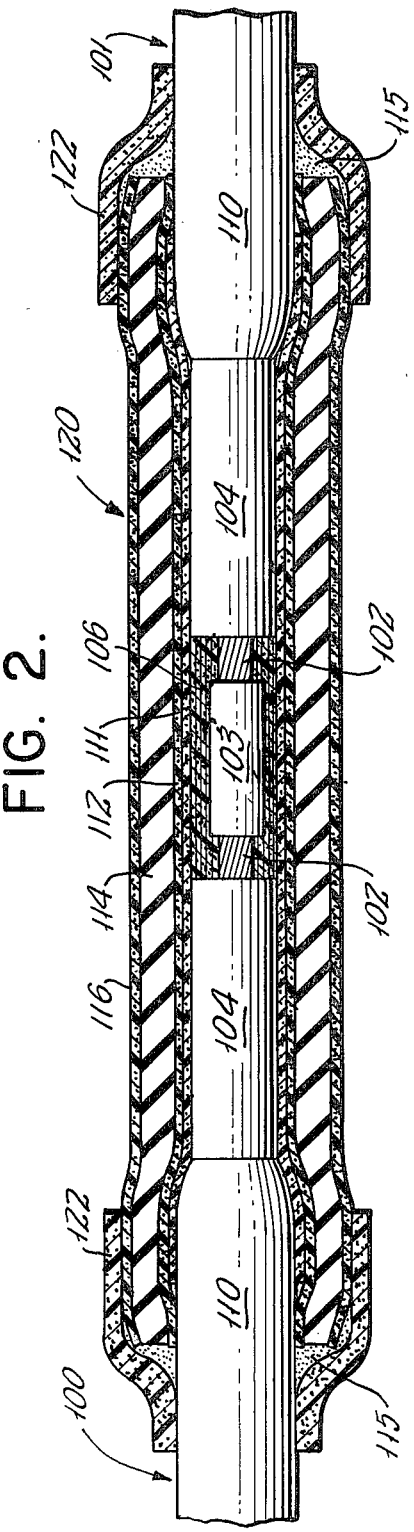
FIG. 2.

ELECTRICAL CABLE JOINT STRUCTURE AND METHOD OF MANUFACTURE

BACKGROUND OF THE INVENTION

The present invention relates generally to a joint structure for joining electrical cables, and more particularly, concerns the insulation structure of a heat shrinkable joint for electrical cables and a method for its manufacture, the joint being particularly useful for high and very high voltage applications.

Numerous methods and joint structures for joining electrical cables are known. However, heat shrinkable, polymeric insulated joints are especially useful for joining extruded electrical cables, because the joints do not have to be manufactured to the same diameter as the cables to be joined. Heat shrinkable joints are also advantageous because they can be applied in a relatively short time.

Existing heat shrinkable joint structures usually include a number of coaxial layers of heat shrinkable tubing extending between the cables being joined. Typically, there is an inner heat shrinkable tube over which one or more layers of additional heat shrinkable tubes are provided, the innermost part of the composite structure having semiconducting characteristics, followed by an insulating layer and another semiconducting layer. Such joints exhibit relatively low dielectric strength and questionable reliability. Heat shrinking a tube over a substrate or over another heat shrinkable tube may lead to the formation of gas bubbles or blisters in the interface between the layers. It may also trap contaminants picked up during different steps in the process. In high voltage applications, partial discharge may occur in these gas bubbles, or voltage enhancement by certain cotaminants may occur which will lead to premature failure of the joint.

Broadly, it is an object of the present invention to overcome the shortcomings of prior art joints and especially of shrinkable joint structures for electrical cables. It is specifically contemplated that such a joint structure be provided which has extremely high electrical strength as high as that of the cables it joins, short length, and efficient longitudinal voltage distribution.

It is another object of the invention to avoid the formation of gas bubbles under the heat shrinkable layers in a heat shrinkable joint structure for cables, thereby avoiding partial discharge in high voltage applications and the associated premature joint failure.

It is also an object of the invention to provide a heat shrinkable joint structure for electrical cable and a method for making the same which are reliable and convenient in use yet relatively inexpensive.

In accordance with an illustrative embodiment demonstrating objects and features of the invention, a multi-layer, heat shrinkable composite tube covering is provided for a cable joint structure in which intimately joined layers define a semiconductive inner or conductor shield, an insulation layer, and an outer or insulation shield for the joint. Furthermore, a highly resistive semiconducting layer is provided over the joint under the innermost layer of the composite tube, forming a dual layer conductor shield for the joint.

In the preferred embodiment, the entire composite tube is pressure extruded in a common operation and all three layers are simultaneously chemically cured and cooled under pressure to provide the intimately joined layers of the composite tube. Subsequently, when the tube is shrunk over the joint, the three layers shrink as a unit, so that there is no possibility of trapping impurities or gas bubbles between layers.

BRIEF DESCRIPTION OF THE DRAWINGS

The foregoing brief description, as well as further objects, advantages and features of the present invention will be more completely understood from the following detailed description of the presently preferred, but nonetheless illustrative, embodiment of the present invention with reference being had to the accompanying drawings in which:

FIG. 1 is a longitudinal cross-sectional view of a conventional prior art extruded cable joint structure;

FIG. 2 is a longitudinal cross-sectional view of the extruded cable joint structure of the present invention.

DETAILED DESCRIPTION OF THE PREFERRED EMBODIMENTS

Figure 3:
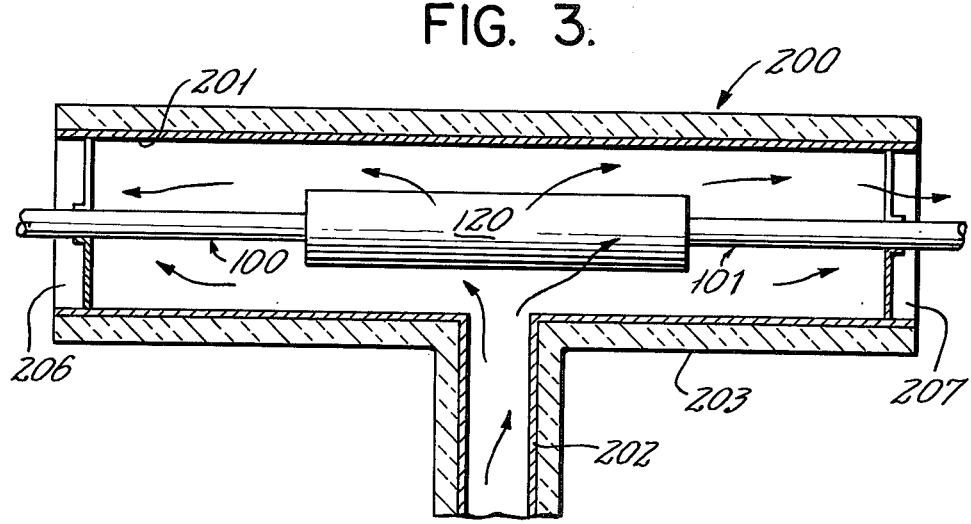
FIG. 3 is a cross-section of a device used to manufacture a composite heat shrinkable tube and joint structure in accordance with the present invention.

FIG. 1 illustrates a typical prior art extruded cable joint structure. The joint is formed between two cables A,B having the conductors 1 and 2, respectively, which are connected together at their ends by a conventional connector 3. As is common, each cable also has a coaxial inner layer of semiconducting conductor shield and over it a layer of cable insulation (5 and 6 for cables A and B, respectively) and this insulation layer is, in turn, covered by a coaxial semiconducting insulation shield (7 and 8). The cable joint is then covered with several coaxial layers of material, as explained in detail below, to provide insulation and to avoid discharges and failure at the joint.

To form the first covering layer, the cable conductors 1 and 2, the connecting piece 3 and the ends of the cable insulation 5 and 6 adjacent the joined ends of the conductors are covered with a semiconductive sealing tape 4 (or an appropriate paint may be used). Adjacent portions of the exposed cable insulation, and the exposed insulation shields 7 and 8, are also covered with a semiconductive tape or paint, indicated as 9 and 10. This tape or paint provides for the release of electrical stresses at the ends of the insulation shields 7 and 8, adjacent the cable insulation 5 and 6. A semi-conducting highly resistive heat shrinkable tube 11 is then shrunk over the insulation shields 7 and 8, and the entire structure extending therebetween. Tube 11 provides the required voltage stress distribution along the cable insulation 5 and 6 and prevents the entry of liquids into the splice area of the joint.

A heat shrinkable insulating tube or a series of tubes 12 are then shrunk over the semiconducting tube 11 and contact the insulation shields 7, 8. The thickness of the insulating tube 12 limits its effectiveness. The tube 12 is typically manufactured by irradiation curing which limits the tube thickness based on the penetration depth of the radiation. Such relatively thick tubes are satisfactory for use in joints of limited voltages only, for example to 15 KV. For joints rated at higher voltages, for example 25 KV and above, two or three of these tubes 12 must be heat shrunk successively over each other. As a result, layer 12 may require a plurality of coaxially layered shrinkable tubes in order to obtain the required dielectric strength.

A second semiconducting heat shrinkable tube 13 is then shrunk over the insulating layer 12 in electrical contact with the cable insulation shields 7 and 8. This tube 13 provides an insulation shield for the joint structure. A metallic shield 14 may be positioned over and connected to the insulation shield 13.

The prior art joint structure requires that at least three layers of heat shrinkable tubing be formed, and additional layers would be present when tube 12 requires a plurality of layers. Each time a tube is shrunk, the possibility of trapping gas bubbles and contaminants arises. Hence, it is quite likely that gas bubbles and/or contaminants would be trapped under at least one of the layers, resulting in an undesirably high rate of early failures due to partial discharges through the gas bubbles.

FIG. 2 illustrates a joint structre embodying the present invention. The joint is formed between cables 100 and 101 each having a cable conductor 102 encased within successive coaxial layers, including: a conductor shield (not shown); a layer of insulation 104; and an outer insulation shield layer 110. On each cable the cable insulation 104 and conductor shield are cut so as to be approximately perpendicular to the cable conductor 102, exposing its bare end; and the insulation shield 110 is removed from the insulation layer 104 so as to separate the insulation shield 110 from the exposed conductor by a distance equal to at least one inch for ever 10 KV of rated voltage between the conductor and the ground. The cut edge of the insulator shield 110 is preferably tapered to the insulation layer 104 to avoid a sharp variation or step between these layers.

Conductors 102 are preferably connected together by a conventional connecting piece 103 but they may also be connected by any other means, such as welding. The diameter of the connecting piece is preferably less than the diameter of the cable insulation 104.

In covering the conductor and connector, it is preferred that the first layer be a semiconducting tape 106, having a resistivity less than 500,000 ohm-cm, which is wrapped around the bare ends of conductors 102 and the connecting piece 103 to a diameter approximately equal to the diameter of the cable insulation 104 so as to fill the gap between the cut ends of the insulation.

As the next covering layer, it is preferred that a highly resistive semiconducting layer 111 be tightly applied. This layer could be applied in the form of a lapped tape layer or a wide sheet wrapped around the core along the length of the joint from one cable insulation shield to the other. The layer 111 therefore covers the semiconductive insulation shields 110, including their tapered exposed ends, the cable insulations 104, and the semiconducting tape 106. The layer 111 is preferably made of a highly deformable material so as to fill any surface imperfections on the layer it covers and layers above it, thereby avoiding the formation of gas voids between the various layers. The layer 111 may, for example, be made of cross linkable polyethylene-vinyl acetate copolymer or cross linkable commercial grade ethylene-propylene rubber. These materials may be filled with carbon black particles or preferably with a mixture of carbon black particles and silicon carbide. When silicon carbide is added, the layer exhibits a non-linear voltage-current characteristic, which provides a more uniform longitudinal grading of the voltage stress. Typically a resistance of $10^{10}$ ohms satisfies the requirements for the semiconducing material. Alternatively, layer 111 may be replaced with an appropriate semiconducting paint.

The final layer of the joint covering is formed by a heat shrinkable composite tube 120 which is shrunk over the semiconducting layer 111. The composite tube 120 contains three intimately joined layers 112, 114 and 116, each of which is preferably between 5 and 50 thousandths of an inch thick. These layers are preferably chemically bonded together. Layer 112 serves as the inner or conductor shield for tube 120. This layer may be made of the same highly resistive and resilient material as the layer 111, and they cooperatively define a dual layer conductor shield for the joint.

Layer 112 and layer 111 are preferably selected to be of similar material to yield proper longitudinal voltage distribution. However, they can also be different, for example, with 111 a high resistive material with only carbon black in polymer base and 111 a different base containing silicon carbide particles. The resistance of the material forming layers 111 and 112 is preferably selected to avoid splice overheating. This means that under A.C. test voltage, the power dissipated in a single phase joint should not exceed 20 watts. In order, however, to provide proper longitudinal voltage grading, the longitudinal resistance of these two layers must be selected so that the longitudinal resistive current is greater than ten percent of the total capacitive current flowing in the joint in the radial direction.

Since the two semiconductng layers 111 and 112 independently provide longitudinal voltage distributions in the same manner, the possibility of partial discharge between the tape 111 and the shield 112 is minimized, even if a gas pocket or bubble were to develop between layers 111 and 112 due to poor workmanship. No partial discharge will occur because the radial voltage stress in the gas trapped between the layers will be zero or minimal when the two layers have no significantly different longitudinal voltage distribution. The reliability of the joint structure of the present invention is therefore considerably higher than that of conventional heat shrinkable joints.

Intermediate layer 114 of the composite heat shrinkable tube 120 is an insulation layer. This layer may be made of any desired thickness. It is preferably an unfilled cross-linkable polyethylene insulation, a cross-linkable ethylene-propylene rubber or a mixture of these two materials.

The outer layer 116 of the composite heat shrinkable tube 120 provides an insulation shield layer for the joint. It is preferably made of filled cross-linkable polyethylene or filled cross-linkable ethylene-propylene rubber. The filling for insulation shield 116 is a conducting material so as to make the layer semiconducting.

Layers 112, 114 and 116 of the composite tube 120 are intimately joined, preferably bonded to each other. This intimate joining is an important aspect of the present invention because it eliminates the formation of gas bubbles in the interfaces between the layers during heat shrinking. The preferred method for manufacturing the composite tube 120, which achieves the intimate joining of layers, and for applying the tube to the joint will be described below.

A sealant 115 may be applied at the ends of the composite tube 120 and at the surface of the cable insulation shields 110. The sealant is preferably a silicone grease or a butyl based sealant material.

Preferably, a short piece of semiconducting tube 122 is heat shrunk over the end of each end of insulation shields 116 of composite tube 120, the adjoining cable insulation shield 110, and sealant 115. Tubes 122, 122 provide for electrical contact between the insulation shield 116 of the joint and the insulation shields 110, 110 of the cables 100 and 101 as well as an additional resistive seal for the joint structure. As an alternative to tubes 122 it is possible to substitute a single heat shrinkable tube to protect the entire length of the joint structure against the ingress of oil or moisture. The semiconducting heat shrinkable tubes 122, 122 or the single heat shrinkable tube replacement, are constructed of semiconducting cross-linked polyethylene, ethylene-propylene rubber, oil resistant semiconducting neoprene rubber or similar materials. Layer 116 can also be joined to the semiconducting insulation shield of the cable by means of semiconducting tape wrapped so as to create a continuity between these two shields. In this particular case, an additional layer of insulating, oil resistant material, such as neoprene, can be shrunk over the entire joint.

As stated above, a feature of the present invention is the insulation layer structure of the heat shrinkable composite tube 120 which eliminates the formation of gas bubbles at layer interfaces during the heat shrinking process. Tube 120 is preferably pressure extruded in a simultaneous operation, similar to the extrusion of the three layers of a high voltage cable, following which all three layers 112, 114 and 116 are simultaneously chemically cured or crosslinked. Thereafter, the tube is expanded to a desired diameter. Inasmuch as the insulation layers are simultaneously chemically cured, the insulation 114 can be of any desired thickness. This is not the case in conventional shrinkable joints in which curing is accomplished by irradiation, thus limiting the thickness of the insulation. This limitation necessitates several separate insulation layers. Irradiation curing is also disadvantageous as it often leads to the formation of electron trees in the insulation structure which weaken the dielectric strength of the insulation.

The extrusion process for manufacturing the composite tube 120 should preferably be conducted at high pressures, greater than about 250 psi. The pressure during simultaneous curing is preferably higher than about 150 psi. These high pressure conditions together with the simultaneous curing of the layers produce a very strong chemical bond between the simultaneously extruded and cured layers of the tube 120.

After extrusion and chemical curing, the three layers are simultaneously expanded to a diameter lager than the diameter of the cured layers or of the diameter of the joined cable conductors. Chemically crosslinked polyethylene or ethylene-propylene rubber expansion of up to about 3.5 times the diameter of the cured layers is acceptable.

The expansion step preferably takes place inside a cylindrical container having an inner diameter up to 3 to 3.5 times greater than the cured composite tube 120 and equal to the desired diameter of the expanded tube. The extruded composite tube 120 is pressurized with a gas or liquid at pressures exceeding 5 psi. Preferably, the pressure of the gas or liquid exceeds 50 psi. The temperature during the expansion step should be above room temperature. Once the desired pressure is achieved on both the inside and outside of the tube 120, the cylindrical container is heated to approximately 150 degrees centigrade or higher. After reaching this temperature, the internal pressure is increased slightly or the external pressure is decreased slightly to produce the expansion. The desired expansion of the three layers 112, 114 and 116 is achieved when the outside diameter of the composite tube 120 is equal to the inner diameter of the cylindrical container.

The three layer composite tube 120 when expanded to 3 to 3.5 times can be heat shrunk by 2.5 to 3 times. Accordingly, one diameter of the composite tube can be used for joints covering a broad range of cable diameters.

The heat shrinking of the joint structure over the connected cable conductors is preferably accomplished in a container 200 such as that illustrated in FIG. 3. Heat shrinking in the manner to be described herein avoids local overheating and provides uniform shrinking over the cable. In the preferred embodiment container 200 has a thin-walled metal tube 201 having a gas inlet 202. On the exterior wall of tube 201 there is provided a layer of thermal insulation 203 to minimize the loss of heat during heat shrinking. The ends of cables 100 and 101 to be joined are positioned approximately in the center of tube 201 directly opposite the gas inlet 202. Preferably the container is 1 to 2 inches onger than the joint. The cables are maintained in their position in the center of the tube 201 by means of separators or spiders 206 and 207. The spiders 206 and 207 provide minimum resistance to the flow of hot air used to heat shrink the joint structure. The hot air is supplied from a heatgun, or the like, though gas inlet 202. The temperature of the hot air is preferably in the range of 150 to 250 degrees centigrade. The length of time that the hot air is applied to the joint is experimentally selected for each size of joint. Typically for joints on cables rated at 15 to 35 KV the time varies from 5 to 20 minutes.

The peferred container 200 containing metal tube 201 and insulation layer 203 is preferably formed in two halves separable along a plane including the axis of the tube 201, so that it can be applied over the joint before shrinking and removed from the joint structure after shrinking. The two halves may be held together by any suitable device such as a clamp.

The joint structure and method of its manufacture described above can be used to join several different types of cables such as for example an oil-paper insulated cable to a solid insulated cable. In this case a conventional oil barrier would first be applied over the oil-paper insulated cable. The present invention can also be used in making different shaped joints such as Y joints and T joints and to join not only cables with round conductors, but also sector-shaped conductors.

Although a preferred form of the invention has been disclosed for illustrative purposes, those skilled in the art will appreciate that many additions, modification and substitutions are possible without departing from the scope and spirit of the invention as defined in the accompanying claims. For example, although the composite shrinkable tube has been described as having three layers, those skilled in the art will appreciate that for relatively low voltage applications a composite tube having only two layers, an insulation layer and a semiconducting insulation shield, which are intimately joined, may be utilized.

What is claimed is:

1. In a joint structure for insulating the junction of a plurality of electrical cables each having a coaxial electrical conductor, said conductors being connected at said junction, a heat shrunk composite tube comprising, in successive, substantially coaxial layers over said conductors at said junction, an inner conductor shield semiconducting layer, an insulation layer, and an outer insulation shield semiconducting layer, said inner and outer shield semiconducting layers being intimately joined to said insulation layer, thereby preventing the occurrence of partial discharge under voltage conditions, the joint structure further comprising a substantially coaxial, highly resistive semiconducting layer disposed intermediate said conductors and said inner conductor shield semiconducting layer, said highly resistive semiconducting layer being substantially coextensive along said cables with said inner conductor shield semiconducting layer to define, in cooperation therewith, a dual layer conductor shield for said joint.

2. The joint structure according to claim 1 wherein said intimate joining is achieved by extruding and curing all of said layers of said composite tube in a common operation.

3. The joint structure according to claim 1 wherein said highly resistive semiconducting layer is made of a material which is readily deformable.

4. The joint structure according to claim 1 wherein the inner conductor shield semiconducting layer of the composite tube and the highly resistive semiconducting layer are made of the same material.

5. The joint structure of claim 1 wherein the longitudinal voltage distribution of the layer of highly resistive semiconducting material is approximately equal to the longitudinal voltage distribution of the inner conductor shield semiconducting layer of the composite tube.

6. The joint structure according to claim 1 wherein the layer of highly resistive semiconducting material is a deformable polymeric material having a resistance of $10^{10}$ ohms.

7. The joint structure according to claim 1 wherein said highly resistive semiconducting material is made of a crosslinkable polyethylene-vinylacetate copolymer filled with a substance from the group consisting of carbon black particles, silicon carbide and mixtures thereof.

8. The joint structure of claim 1 wherein the layer of highly resistive semiconducting material is in the form of tape applied as a single lapped layer.

9. The joint structure of claim 1 wherein the layer of highly resistive semiconducting material is in the form of paint.

10. The joint structure of claim 1 wherein the insulation layer of the composite tube is a substance from the group consisting of an unfilled crosslinkable polyethylene, ethylene-propylene rubber or mixtures thereof and may have any predetermined thickness.

11. An improved joint structure for insulating the bare ends of insulated electrical cables joined together by electrically conductive connecting means covered with a semiconducting material layer which is approximately flush with the outside diameter of the cable insulation, wherein the improvement comprises:
  a layer of highly resistive semiconducting material covering the cable insulation and the semiconducting material layer; and
  a heat shrunk composite tube having an insulation layer and an inner conductor shield semiconducting layer intimately joined in successive coaxial layers, said composite tube being positioned over said highly resistive semiconducting material layer with said inner conductor shield semiconducting layer thereof cooperating with said layer of highly resistive semiconducting material to define a dual layer conductor shield for said joint.

12. The joint structure of claim 11 wherein said highly resistive semiconducting material layer is made of a readily deformable material so as to compensate for surface imperfections of said insulation layer and said inner conductor shield semiconducting layer.

13. The joint structure of claim 11 wherein the insulation layer of the composite tube has any predetermined thickness.

14. A method for manufacturing a joint structure for insulating the junction of electrical cables each having a conductor and successive coaxial layers defining an insulation layer and an insulation shield semiconducting layer, said method comprising the steps of:
  cutting back the insulation layer from the cable conductors to expose the ends of the conductors;
  cutting back the insulation shield semiconducting layers of the cable conductors to expose lengths of cable insulation layer equal to one inch for each 10 KV of rated voltage;
  connecting the ends of the conductors with a connecting piece having a diameter less than the diameter of the cable insulation layer;
  applying a semiconducting tape over the ends of the conductors and the connecting piece to a diameter approximately equal to the outside diameter of the cable insulation layer;
  covering the cable insulation shield semiconducting layers, cable insulation layers, and semiconducting tape with a layer of highly resistive semiconducting, readily deformable material; and
  heat shrinking, over the layer of highly resistive semiconducting material, a heat shrinkable composite tube having an inner conductor shield semiconducting layer, a layer of insulation and an outer insulation shield semiconducting layer intimately joined together in successive coaxial layers.

15. The method of claim 14 further comprising:
  applying a sealant at the ends of the composite tube and over the cable insulation shield semiconducting layers; and
  heat shrinking at least one semi-conducting tube over each end of the insulation shield semiconducting layer of the composite tube, cable insulation shield semiconducting layer and sealant.

16. The method of claim 14 wherein said heat shrinking step is performed with the aid of a device for heat shrinking a heat shrinkable multi-layered composite tube over said cable joint, said device comprising:
  an elongated cylindrical container dimensioned to receive therein the cable joint with the composite tube coaxially positioned thereover, said container having an inlet portion for hot gas extending outwardly from the container at approximately the longitudinal center of said joint;
  a layer of thermal insulation covering the exterior wall of the container;
  means for retaining the joint in position in said container, said retaining means being constructed to provide minimum resistance to the flow of hot gas admitted from said inlet for heat shrinking said composite tube; and
  said shrinking step being performed by placing within said cylindrical container the cable joint with the composite tube coaxially positioned thereover, the joint being held in place by said retaining means, and injecting hot gas into said inlet portion to shrink said composite tube.

17. The method of claim 16 wherein said cylindrical container comprises two halves adapted to be joined along a longitudinal seam along said device and means for detachably joining together said halves along said seam, the container being opened before and after heat shrinking for insertion and removal of said cable joint.

* * * * *